(12) United States Patent
Wang

(10) Patent No.: US 6,419,103 B1
(45) Date of Patent: Jul. 16, 2002

(54) BAMBOO BASKET

(76) Inventor: Wen-Tsan Wang, PO Box 82-144, Taipei (TW)

( * ) Notice: Subject to any disclaimer, the term of this patent is extended or adjusted under 35 U.S.C. 154(b) by 0 days.

(21) Appl. No.: 09/835,545

(22) Filed: Apr. 17, 2001

(51) Int. Cl.[7] .................................................. B65D 6/16
(52) U.S. Cl. ...................... 220/4.33; 220/650; 220/641; 220/642
(58) Field of Search ................................ 220/9.1, 4.33, 220/646, 650, 641, 642

(56) References Cited

U.S. PATENT DOCUMENTS

| | | | | |
|---|---|---|---|---|
| 1,428,070 A | * | 9/1922 | Young | 220/4.33 |
| 1,627,282 A | * | 5/1927 | Gray | 220/4.33 |
| 5,638,973 A | * | 6/1997 | Dewey et al. | 220/4.33 |
| 5,720,403 A | * | 2/1998 | Sawyer | 220/4.33 |
| 6,227,398 B1 | * | 5/2001 | Yang et al. | 220/4.33 |

* cited by examiner

Primary Examiner—Joseph M. Moy
(74) Attorney, Agent, or Firm—Leong C. Lei

(57) ABSTRACT

A bamboo basket includes a bottom frame, a top open frame, a plurality of peripheral side panels respectively connected between the bottom frame and the top open frame and abutted against one another at an angle and defining with the bottom frame and the top open frame a holding space for holding things, the peripheral side panels each having a plurality of longitudinal bamboo slats and a plurality of transverse bamboo slats intersected with the longitudinal bamboo slats, a plurality of upright angle bars respectively connected between the bottom frame and the top open frame and attached to the abutted area between each two of the peripheral side panels at an outer side, and a plurality of packing strips respectively adhered to the peripheral side panels over the abutted area between each two of the peripheral side panels at an inner side opposite to the upright angle bars and a bottom side of each of the peripheral side panels.

3 Claims, 4 Drawing Sheets

BAMBOO BASKET

BACKGROUND OF THE INVENTION

The present invention relates to baskets and, more particularly, to a bamboo basket, which is practical for production by a mass production process.

A variety of materials including ceramics, glass, wood, plastics, stainless steel, and etc., may be used for making containers for holding things as well as for the purpose of decoration. Recently, small decorative items of bamboo and wooden materials have been well invited by consumers. Conventional bamboo baskets are commonly made by adhering bamboo slats a woven structure of bamboo strips to shaped frames. There are also known bamboo baskets in which wire members are used to fasten bamboo slats or woven structure of bamboo strips to shaped frames. A bamboo basket made by using glue to fasten bamboo slats a woven structure of bamboo strips to shaped frames is less strong, and the bamboo slats or woven structure tends to be forced away from the shaped frames. A bamboo basket made by using wire members to fasten bamboo slats or woven structure of bamboo strips to shaped frames is complicated and expensive.

SUMMARY OF THE INVENTION

The present invention provides a bamboo basket, which has a strong structural strength and, is inexpensive to manufacture. According to one aspect of the present inventions the bamboo basket is comprised of a bottom frame, a top open frame, a plurality of peripheral side panels respectively connected between the bottom frame and the top open frame and abutted against one another at an angle and defining with the bottom frame and the top open frame a holding space for holding things, the peripheral side panels each having a plurality of longitudinal bamboo slats and a plurality of transverse bamboo slats intersected with the longitudinal bamboo slats, a plurality of upright angle bars respectively connected between the bottom frame and the top open frame and attached to the abutted area between each two of the peripheral side panels at an outer side, and a plurality of packing strips respectively adhered to the peripheral side panels over the abutted area between each two of the peripheral side panels at an inner side opposite to the upright angle bars and a bottom side of each of the peripheral side panels. According to another aspect of the present invention, the longitudinal bamboo slats and transverse bamboo slats of each peripheral side panel have a series of longitudinally arranged coupling notches. By engaging the coupling notches of the longitudinal bamboo slats to the coupling notches of the transverse bamboo slats, the longitudinal bamboo slats and the horizontal bamboo slats are intersected together. According to another aspect of the present invention, the top open frame, the bottom frame, the peripheral side panels and the upright angle bars have respective through holes, and lock pins are respectively mounted in the respective through holes of the top open frame, the bottom frame, the peripheral side panels and the upright angle bars to secure them positively together.

DETAILED DESCRIPTION OF THE PREFERRED EMBODIMENT

Figure 1:
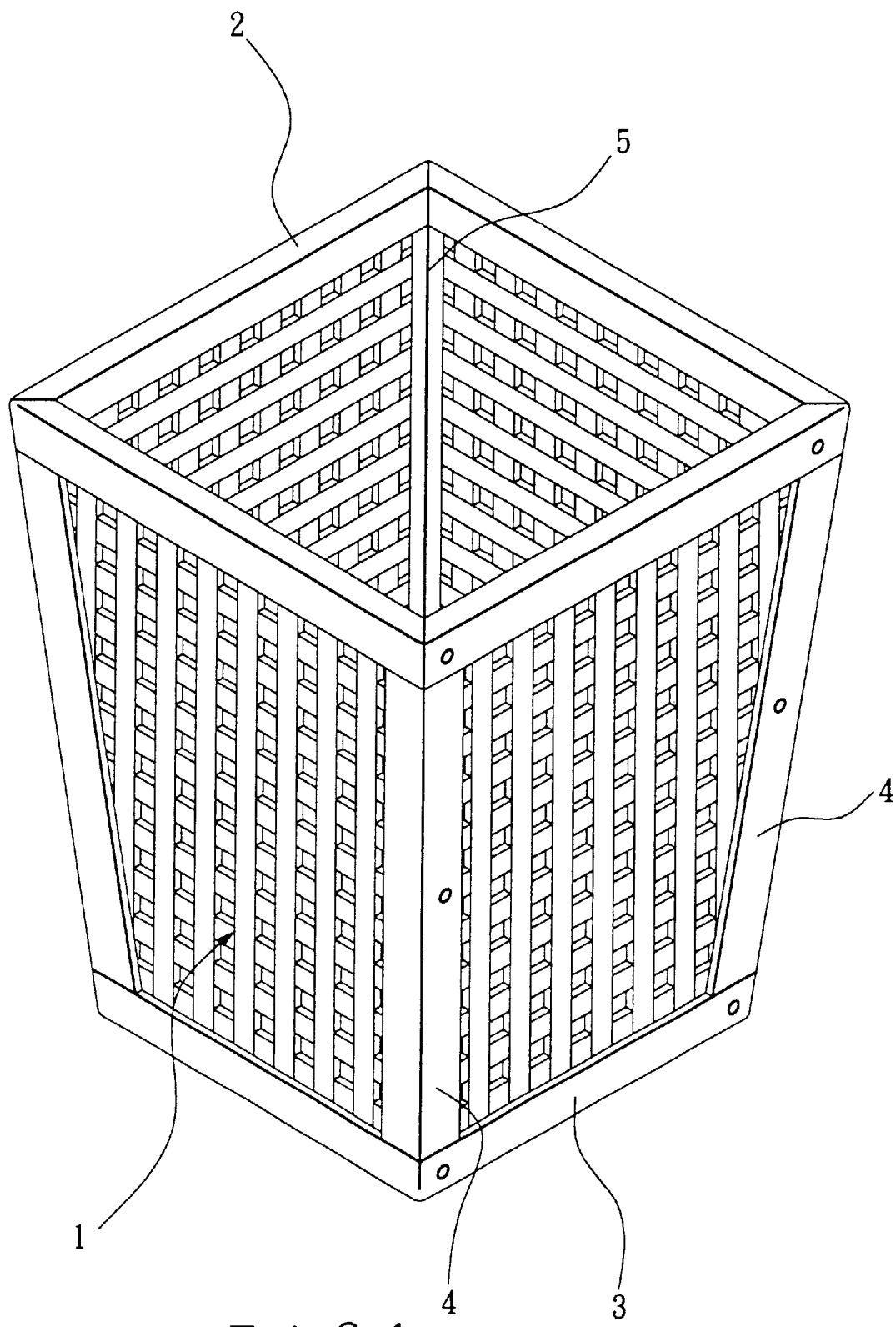
FIG. 1 is a perspective view of a bamboo basket constructed according to the present invention.

Referring to FIG. 1, a bamboo basket in accordance with the present invention is generally comprised of four peripheral side panels 1, a top frame 2, a bottom frame 3, four upright angle bars 4, and four packing strips 5. The four peripheral side panels 1 form the four sides of the bamboo basket. The four upright angle bars 4 are respectively disposed at an outer side of the connection area between each two adjacent peripheral side panels 1. The four packing strips 5 are disposed at four sides, and respectively attached to the bottom side of each peripheral side panel and the connection area between each two adjacent peripheral side panels 1. The bottom frame 3 is coupled to the basket body formed of the peripheral side panels 1 and the upright angle bars 4 at the bottom side. The top frame 2 is coupled to the basket body formed of the peripheral side panels 1 and the upright angle bars 4.

Figure 2:
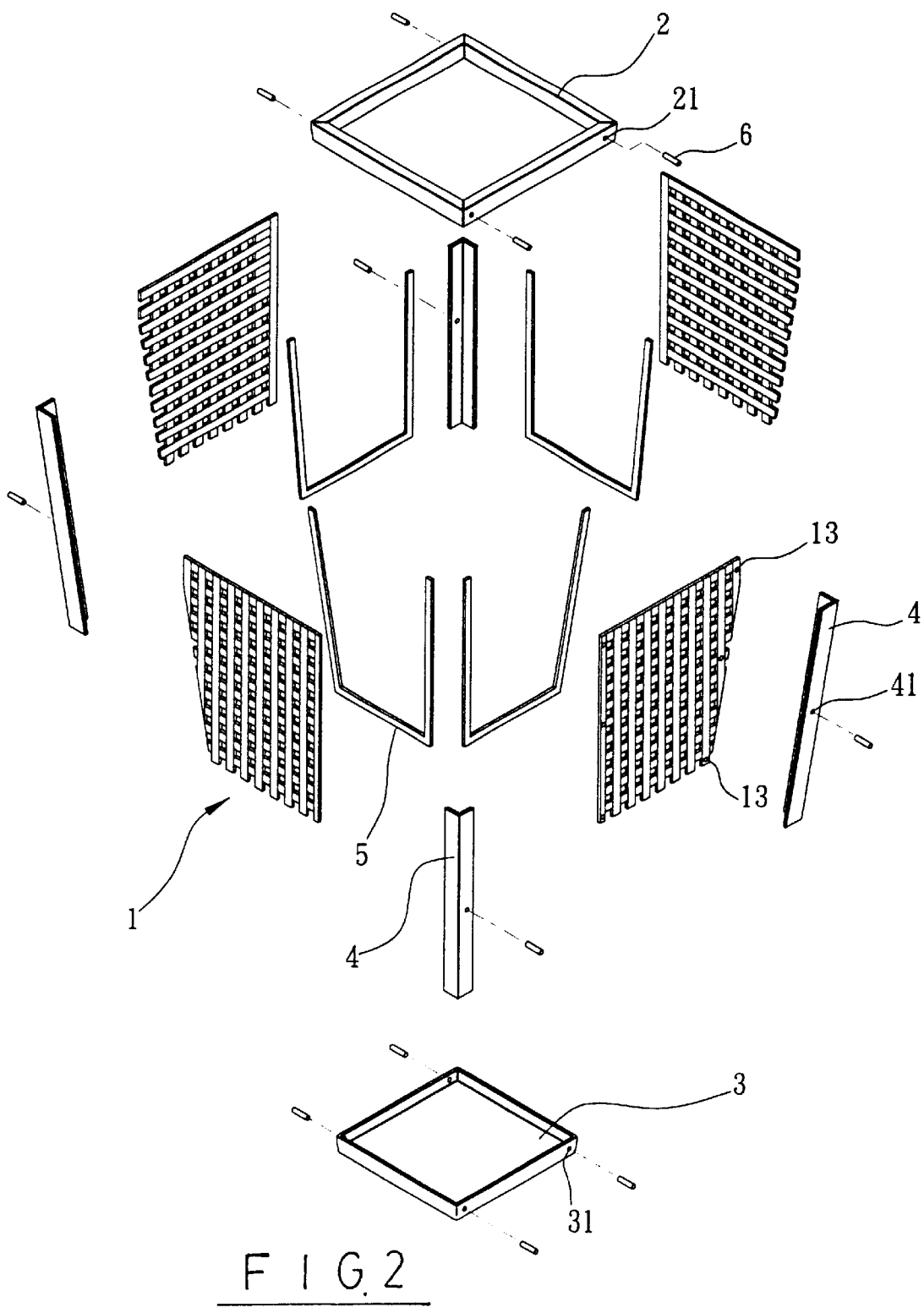
FIG. 2 is an exploded view of the bamboo basket according to the present invention.
Figure 3:
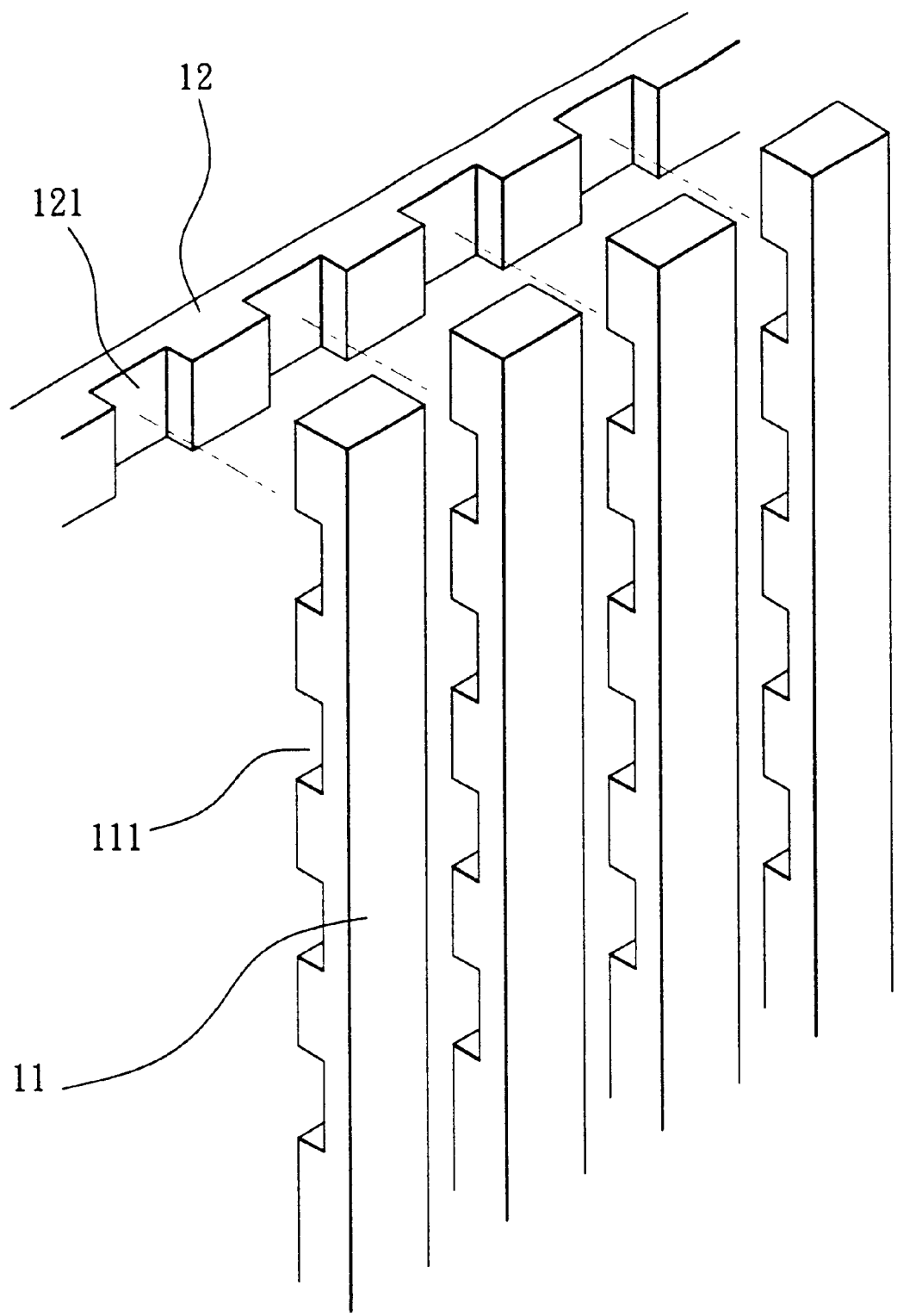
FIG. 3 is an exploded view in an enlarged scale of a part of one peripheral side panel according to the present invention.

Referring to FIG. 2, the top frame 2 is a rectangular open frame, having a plurality of through holes in the peripheral wall thereof. The side panels 1 are flat wall members with open spaces therein, each comprised of a plurality of longitudinal bamboo strips 11 and a plurality of horizontal bamboo strips 12 intersected with the longitudinal bamboo strips 11. The bamboo strips 11 and 12 each have a plurality of coupling notches 111;121 equally spaced at one side along the length. The bamboo strips 111;121 are connected together by forcing the coupling notches 111 of the longitudinal bamboo strips 11 into engagement with the coupling notches 121 of the transverse bamboo strips 12. The peripheral side panels 1 each have a plurality of through holes 13 respectively disposed near the top and bottom sides as well as on the middle between the top and bottom sides. The upright angle bars 4 each have a plurality of through holes 41 on the middle. The bottom frame 3 is a solid frame having a solid bottom sidewall and four upright peripheral sidewalls disposed along the sour peripheral sides of the solid bottom sidewall. The bottom frame 3 also has through holes 31 in the four sides thereof. The packing strips 5 have a length corresponding to the combined length of the bottom side and two opposite lateral sides of each peripheral side panel 1.

Referring to FIG. 2 again, the four peripheral side panels 1 are arranged in four sides, and then the bottom side of each of the peripheral side panels 1 is respectively attached to the inside of the bottom frame 3, and then respective lock pins 6 are respectively inserted through the through holes 31 of the bottom frame 3 into the corresponding through holes 13 of the peripheral side panels 1 to fixedly secure the peripheral side panels 1 and the bottom frame 3 together, and then the upright angle bars 4 are respectively connected to the connecting area between each two adjacent peripheral side panels 1, and then respective lock pins 6 are respectively inserted through the through holes 41 of the upright angle bars 4 and the corresponding through holes 13 of the peripheral side panels 1 to fixedly secure the upright angle bars 4 to the peripheral side panels 1, and then the top frame 2 is attached to the peripheral side panels 1 and the upright angle bars 4 at the top side, and then respective lock pins 6 are respectively inserted through the through holes 21 of the top frame 2 and the corresponding through holes 13 of the peripheral side panels 1 to fixedly secure the top frame 2 to the peripheral side panels 1 and the upright angle bars 4, and then the packing strips 5 is covered with a layer of glue at one side and respectively adhered to the bottom side and two opposite lateral sides of the inner sidewall of each of the peripheral side panels 1.

Figure 4:
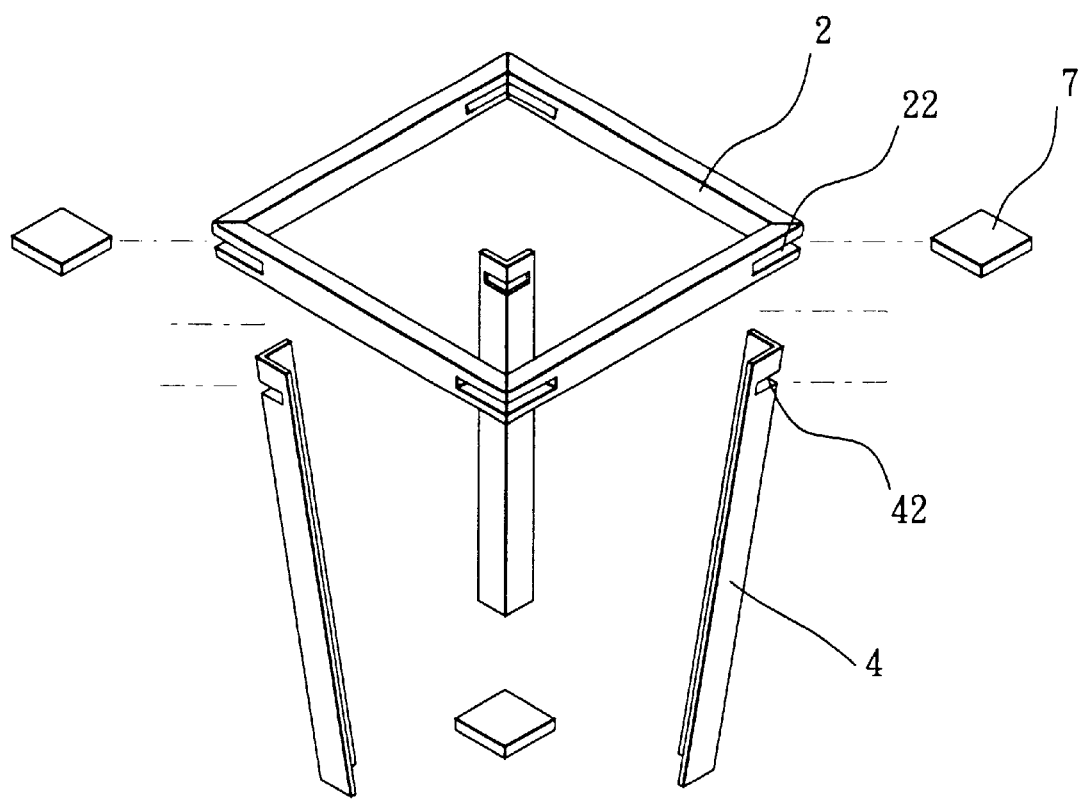
FIG. 4 is an exploded view of a part of an alternate form of the present invention.

FIG. 4 shows another connection arrangement between the top frame 2 and the upright angle bars 4. As illustrated, the top frame 2 has four slots 22 in the four corners, the upright angle bars 4 each have a slot 42 near the top end, and wedge blocks 7 are respectively engaged into the slots 22 of the top frame 2 and the slot 42 of each of the upright angle bars 4 to'secure the top frame 2 and the upright angle bars 4 together. Similarly, the connection between the bottom frame and the upright angle bars can be achieved in the same manner.

A prototype of bamboo has been constructed with the features of FIGS. 1~4. The bamboo basket functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A bamboo basket comprising:

a bottom frame;

a top open frame;

a plurality of peripheral side panels respectively connected between said bottom frame and said top open frame and abutted against one another at an angle and defining with said bottom frame and said top open frame a holding space for holding things, said peripheral side panels each comprising a plurality of longitudinal bamboo slats and a plurality of transverse bamboo slats intersected with said longitudinal bamboo slats;

a plurality of upright angle bars respectively connected between said bottom frame and said top open frame and attached to the abutted area between each two of said peripheral side panels at an outer side; and a plurality of packing strips respectively adhered to said peripheral side panels over the abutted area between each two of said peripheral side panels at an inner side opposite to said upright angle bars and a bottom side of each of said peripheral side panels.

2. The bamboo basket of claim 1 wherein said top open frame and said bottom frame each comprise a plurality of through holes in respective peripheral sides; said peripheral side panels each comprise a plurality of top through holes respectively fastened to the through holes of said top open frame by respective lock pins, a plurality of bottom through holes respectively fastened to the through holes of said bottom frame by respective lock pins, and a plurality of intermediate through holes spaced between said top through holes and said bottom through holes; said upright angle bars each comprise a plurality of through holes disposed on the middle and respectively fastened to the intermediate through holes of said peripheral side panels by respective lock pins.

3. The bamboo basket of claim 1 wherein said top open frame and said bottom frame each comprise a plurality of coupling slots in respective corners thereof; said upright angle bars each have two coupling slot respectively fastened to the coupling slots of said top open frame and said bottom frame; a plurality of wedge blocks are respectively engaged into the coupling slots of said bottom frame, said top open frame and said upright angle bars to fixedly secure said bottom frame, said top open frame and said upright angle bars together.

* * * * *